(12) United States Patent  
Sugikawa

(10) Patent No.: US 7,475,244 B2  
(45) Date of Patent: Jan. 6, 2009

(54) WIRELESS COMMUNICATION DEVICE, PORTABLE TERMINAL, COMMUNICATION CONTROL PROGRAM AND COMMUNICATION SYSTEM

(75) Inventor: Akihiko Sugikawa, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 767 days.

(21) Appl. No.: 10/699,892

(22) Filed: Nov. 4, 2003

(65) Prior Publication Data

US 2004/0092249 A1      May 13, 2004

(30) Foreign Application Priority Data

Nov. 5, 2002    (JP)    ............... 2002-321348

(51) Int. Cl.

| H04L 9/00 | (2006.01) |
|---|---|
| H04N 7/16 | (2006.01) |
| H04B 7/00 | (2006.01) |
| H04L 9/32 | (2006.01) |
| G09C 1/00 | (2006.01) |
| H04Q 7/38 | (2006.01) |

(52) U.S. Cl. .......................... 713/168; 725/8; 380/277
(58) Field of Classification Search ................. 713/168; 725/8; 380/277
See application file for complete search history.

(56) References Cited

U.S. PATENT DOCUMENTS

2003/0007641 A1* 1/2003 Kinoshita ............... 380/270  
2004/0015689 A1* 1/2004 Billhartz ................. 713/156

FOREIGN PATENT DOCUMENTS

| EP | 1 213 882 | 6/2002 |
|---|---|---|
| JP | 2002-152196 | 5/2002 |
| WO | WO 01/76154 | 10/2001 |
| WO | WO 2006086554 A2 * | 8/2006 |

OTHER PUBLICATIONS

Thibault Candebat, Cameron Ross Dunne, David T. Gray, "Pseudonym Management Using Mediated Identity-Based Cryptography", Nov. 2005, DIM '05: Proceedings of the 2005 workshop on Digital identity management, pp. 1-10.*
L. Zhou, et al., IEEE Network, vol. 13, No. 6, XP-000875728, pp. 24-30, "Securing AD HOC Networks", Nov. 1999.
U.S. Appl. No. 10/699,892, filed Nov. 4, 2003, Sugikawa.
U.S. Appl. No. 10/774,411, filed Feb. 10, 2004, Sugikawa.
U.S. Appl. No. 10/776,275, filed Feb. 12, 2004, Sata et al.
U.S. Appl. No. 10/767,369, filed Jan. 30, 2004, Sata et al.

* cited by examiner

Primary Examiner—Emmanuel L Moise  
Assistant Examiner—Courtney D Fields  
(74) Attorney, Agent, or Firm—Oblon, Spivak, McClelland, Maier & Neustadt, P.C.

(57) ABSTRACT

A wireless communication device, comprising: a wireless communication unit which communicates with other communication device located at a prescribed range; a first identification information generator which generates first identification information including a service name of available service and inherent information; an encryption unit configured to encrypt said first identification information by using a prescribed encryption key to generate encryption data; a second identification information generator which generates second identification information including the service name, the inherent information and the encryption data; and an inherent information transmitter which transmits the second identification information for an other communication device which has requested transmission of the inherent information.

19 Claims, 12 Drawing Sheets

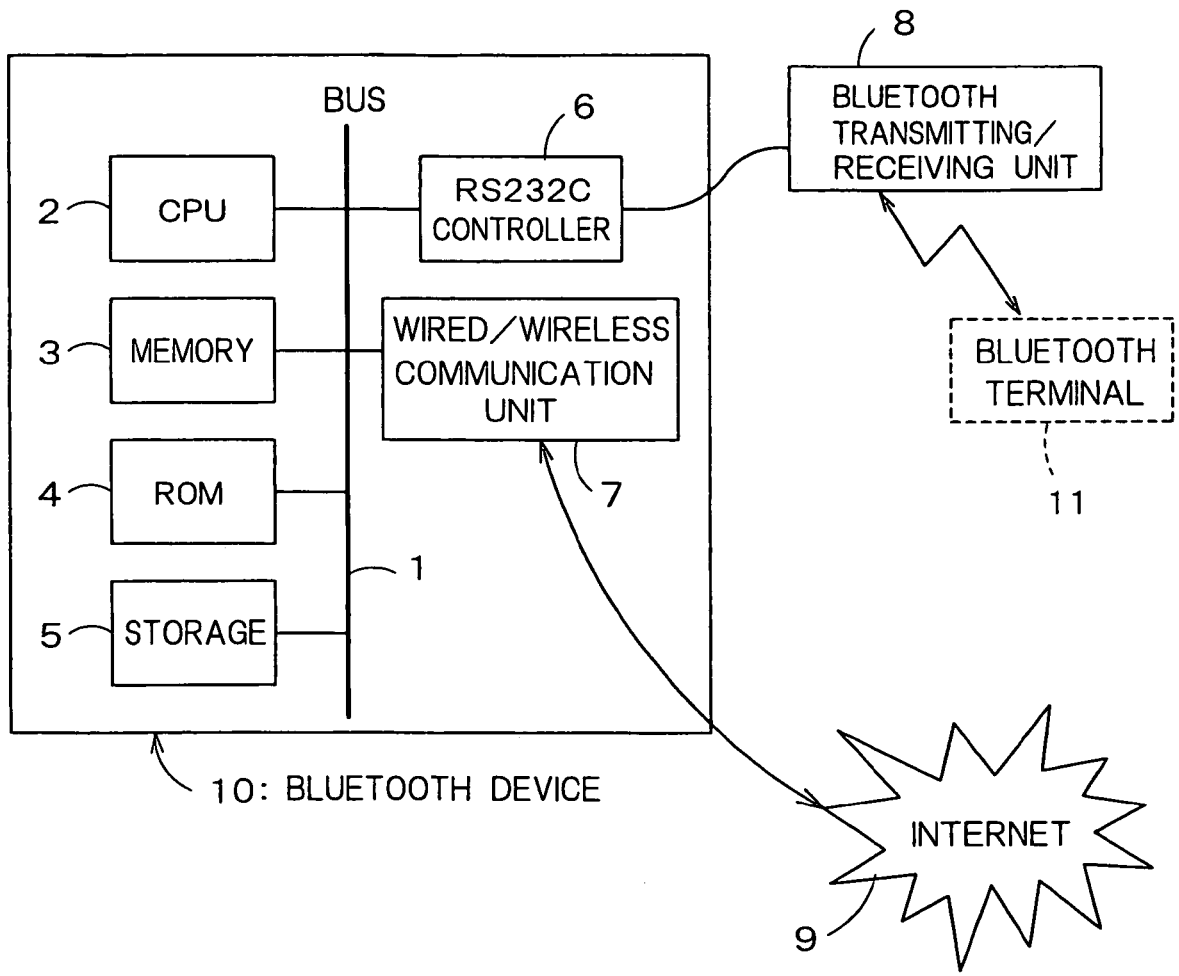
F I G. 1

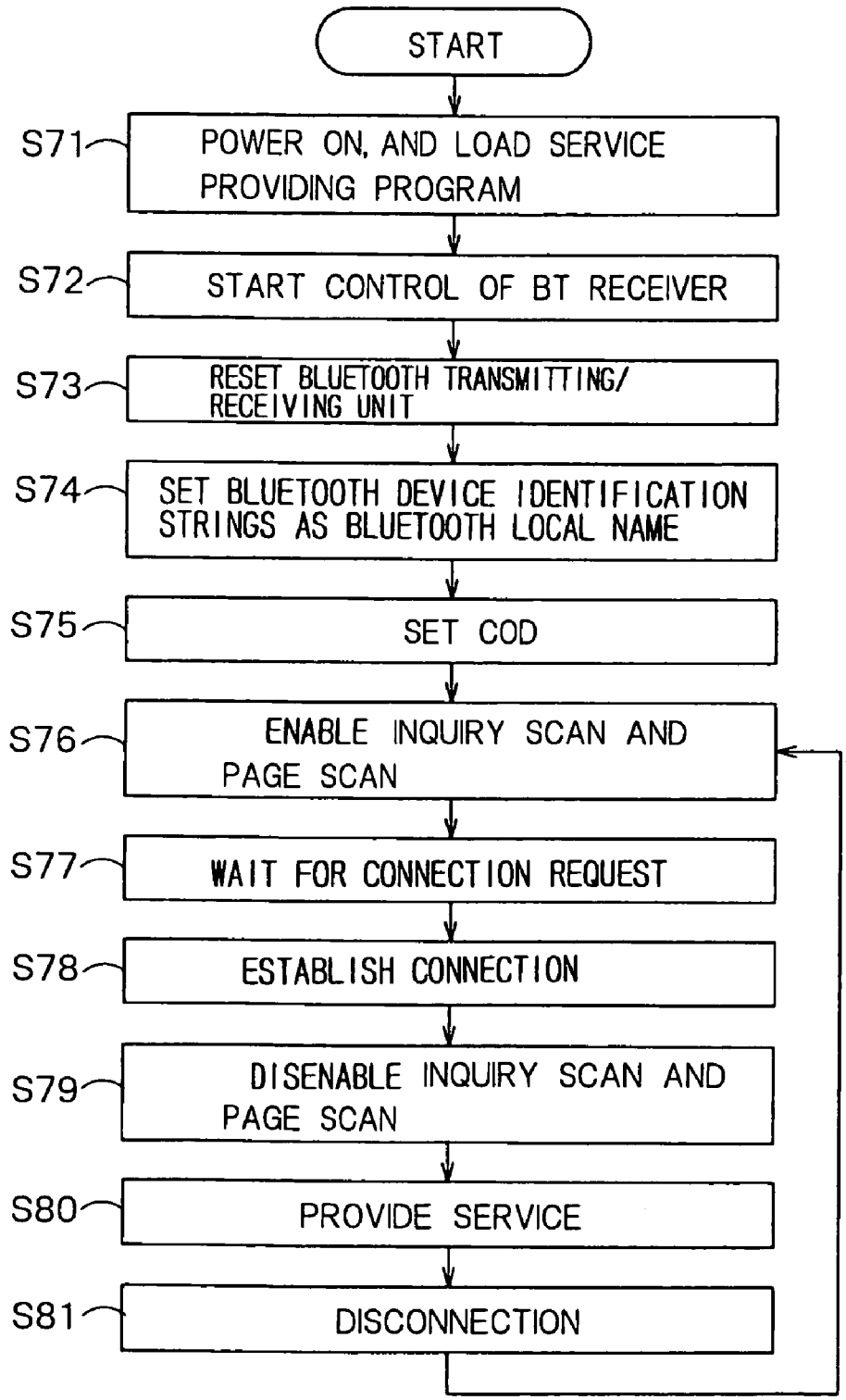
F I G. 5

WIRELESS COMMUNICATION DEVICE, PORTABLE TERMINAL, COMMUNICATION CONTROL PROGRAM AND COMMUNICATION SYSTEM

CROSS REFERENCE TO RELATED APPLICATIONS

This application claims benefit of priority under 35USC § 119 to Japanese Patent Application No. 2002-321348, filed on Nov. 5, 2002, the entire contents of which are incorporated by reference herein.

BACKGROUND OF THE INVENTION

1. Field of the Invention

The present invention relates to a wireless communication device for communicating at a relatively narrow range such as Bluetooth, a portable terminal for communicating with such kind of wireless communication device, a communication control program and a communication system.

2. Related Background Art

As disclosed in Japanese patent Laid-open No. 152196/2002, a short-range wireless communication system in which a transmission distance is about 10 m is recently paid attention. An effective transmission distance range of a conventional wireless LAN is not less than 100 m. Although transmission range in the short-range wireless communication system is narrow, power consumption is low. Because of this, the short-range wireless communication system is suitable for information processing devices having a limited battery capacity such as a portable information processing device (hereinafter, called as a portable terminal). The portable terminals are, for example, a portable telephone or a PDA.

Bluetooth™ is one type of such kind of short-range wireless communication systems, as disclosed in Member Web Site, "Specifications", URL: http://www.bluetooth.org. Recently, the portable terminal having the Bluetooth communication function is going to become widespread.

Because a unit price of devices is low and the devices can be downsized, it is predicted that devices having Bluetooth communication function becomes widespread at various places. If Bluetooth becomes widespread, it is possible to provide service and information suitable for each of various places.

For example, in convenience stores, supermarkets, retailing stores and so on, it is possible to provide services for customers, such as an electric coupon service, an electric point service, an electric payment, and a receipt issuance. Furthermore, there may be applications such as control of gate-open/close by using an electric ticket, payment and discount service in vending machines, and payments at parking lots, gasoline stands and drive-through. Besides, Bluetooth is also applicable to Internet access, information distribution and provision of location information. Especially, it is predicted that a lot of devices having the Bluetooth communication function are provided to stations and meeting spots where a lot of people gather.

Hereinafter, a conventional technique will be described based on one example in which connection of Bluetooth is established between the portable terminal having the Bluetooth communication function (hereinafter, called a Bluetooth terminal), and an information processing device having the Bluetooth communication function which provides various services (hereinafter, called a Bluetooth device), and the Bluetooth device provides various services to users having the Bluetooth terminal.

First of all, procedure in which the Bluetooth terminal receives services from arbitrary other device at an arbitrary location will be described. First, an application for receiving services is started up. Next, the Bluetooth terminal performs inquiry and tries to find other terminals capable of communicating.

Next, the Bluetooth terminal acquires the remote name of the found terminal. Next, when a constant time is passed and the inquiry is finished, the Bluetooth terminal indicates to user a list of the remote names of the devices found by the inquiry.

Next, the Bluetooth terminal performs an ACL connection request for the Bluetooth device selected by user. After the ACL connection is finished, the Bluetooth terminal transmits a service information acquisition command.

Next, the Bluetooth terminal acquires service information, and detects whether or not a profile used by the application is supported. If the profile is supported, the Bluetooth terminal acquires the connection information relating to the profile.

The Bluetooth terminal performs connection request for the profile by using the acquired information. After the connection of the profile is finished the Bluetooth terminal performs server certification at application level.

By the above-mentioned procedure, users can receive a desirable service by using the Bluetooth terminal.

Hereinafter, a state in which the services using the Bluetooth and information providing devices prevail, and a lot of Bluetooth devices are arranged at places such as stations and spots where a lot of people gather is assumed. Especially, at a place where a lot of people gather, it is easy to assume situations in which information useless to a lot of people, such as loan, adult information and gamble are distributed.

In such situations, when trying to find the Bluetooth devices capable of communicating from the Bluetooth terminal in order to acquire the services and the information, a lot of Bluetooth devices are found, regardless of whether or not they are useful.

In the present circumstances, when a COD (Class of Device) in which information relating to the kind of the Bluetooth devices is described is used, it is possible to narrow down only the Bluetooth device which provides desirable services.

However, the COD discriminates the kinds of the devices, but does not discriminate the service as it is. For example, even if there is a category of the information providing device in the COD, it is impossible to discriminate which information the device discriminates. The device is identified only after its name is acquired by a remote name.

However, the remote name can be easily set. Therefore, in order to know the kinds of services and information that the device provides, connection is performed by the profile for the information service, for example, connection of FTP (File Transfer Protocol) is performed, and the information has to be actually acquired.

When a dedicated application is used for acquiring certain information, for example, when bar information is necessary, a common key is given to devices for providing bar information in advance. It is possible to prevent connection with false devices by using a link certification function of the Bluetooth or certification function of other communication devices by OBEX (Object Exchange).

In both of the Bluetooth link certification and the OBEX certification, whether or not to be a correct device cannot be confirmed until when user connects to the device. Therefore, when a lot of devices for providing useless information exist, it takes much time to acquire the service and the information that user needs truly.

When an only advertising statement which grabs user's attention is embedded in the remote name, and user searches the device capable of communicating, user sees the advertising statement, and may go wrong selection of the terminal desired by user.

Because the remote name can be easily set, whether or not the device supports the services or information desired by user has to be confirmed by connecting actually. Accordingly, it takes too much time and work for user.

When the device in which the advertising statement is set to the remote name exists, user may go wrong the selection of the device which user wants connection.

Furthermore, recently, a method of directly communicating and performing data exchange between the portable terminals without the server is also realized. For example, services searching users having the same purpose and exchanging mail addresses and telephone numbers are being provided. In such services, when identity of the other communication device is not assured, it is anxious to perform data exchange with the other communication device. Even in P2P communication, it is desirable to promptly communicate with the other communication device that identity is assured.

SUMMARY OF THE INVENTION

An object of the present invention is to provide a wireless communication device, a portable terminal, a communication control program and a program which controls the portable terminal.

A wireless communication device according one embodiment of the present invention, comprising:

a wireless communication unit which communicates with other communication device located at a prescribed range;

a first identification information generator which generates first identification information including a service name of available service and inherent information;

an encryption unit configured to encrypt said first identification information by using a prescribed encryption key to generate encryption data;

a second identification information generator which generates second identification information including the service name, the inherent information and the encryption data; and an inherent information transmitter which transmits the second identification information for an other communication device which has requested transmission of the inherent information.

A portable terminal according to one embodiment of the present invention, comprising:

a wireless communication unit which communicates with other communication devices located at a prescribed range;

a search unit configured to search the other communication devices capable of communicating;

an identification information acquisition unit configured to acquire first identification information transmitted from the searched communication device;

an information extracting unit configured to extract a service name, inherent information and encryption data from the acquired first identification information;

a decryption unit configured to decrypt the encryption data by using a prescribed decryption key;

a comparison unit configured to compare the decrypted data with the service name and the inherent information extracted by said information extracting unit, and determines whether or not the other communication device searched by said search unit is reliable; and a communication controller which inhibits communication with the communication device determined to be unreliable by said comparison unit.

Furthermore, a program which controls a wireless communication device according to one embodiment of the present invention, comprising:

communicating with other communication devices located at a prescribed range;

generating first identification information including a service name of available information and inherent information;

generating second identification information including the service name, the inherent information and the encryption data; and transmitting the second identification information for the other communication device which has requested transmission of the inherent information.

Furthermore, a program which controls a portable terminal according to one embodiment of the present invention, comprising:

communicating with other communication devices located at a prescribed range;

searching a communication device capable of communicating;

acquiring first identification information transmitted from the searched communication device;

extracting a service name, inherent information and encryption data from the acquired first identification information;

decrypting the encryption data by using a prescribed decryption key;

comparing the decoded data with the extracted service name and inherent information, and determining whether or not the communication device searched by the searching unit is reliable based on the comparison result; and inhibiting communication with the communication device determined to be unreliable by the comparison result.

Furthermore, a communication system comprising a portable terminal and a wireless communication unit capable of communicating with said portable terminal located at a prescribed range, wherein said portable terminal includes:

a searching unit configured to search a communication device capable of communicating;

an identification information acquisition unit configured to acquire first identification information transmitted from the searched communication device;

an information extracting unit configured to extract a service name, inherent information and encryption data from the acquired first identification information;

a decryption unit configured to decrypt the encryption data by using a decryption key prescribed in advance;

a comparison unit configured to compare the decrypted data with the service name and the inherent information extracted by said information extraction unit, and determines whether or not the communication device searched by said searching unit is reliable; and a communication controller which inhibits communication with the communication device determined to be unreliable by said comparison unit, said wireless communication unit includes:

an inherent information acquisition unit configured to acquire the inherent information;

a first identification information generator which generates first identification information including the service name and the inherent information;

an encryption unit configured to encrypt the first identification information by using the encryption key prescribed in advance, and generates the encryption data;

a second identification information generator which generates second identification information including the service name, the inherent information and the encryption data; and an inherent information transmitter which transmits the second identification information for the other communication device which has requested transmission of the inherent information.

BRIEF DESCRIPTION OF THE DRAWINGS

FIG. 1 is a diagram showing internal configurations of the Bluetooth device according to one embodiment of the information providing device of the present invention.

FIG. 5 is a flowchart showing processing procedure at time of providing service in the Bluetooth device.

DESCRIPTION OF THE PREFERRED EMBODIMENTS

Figure 2:
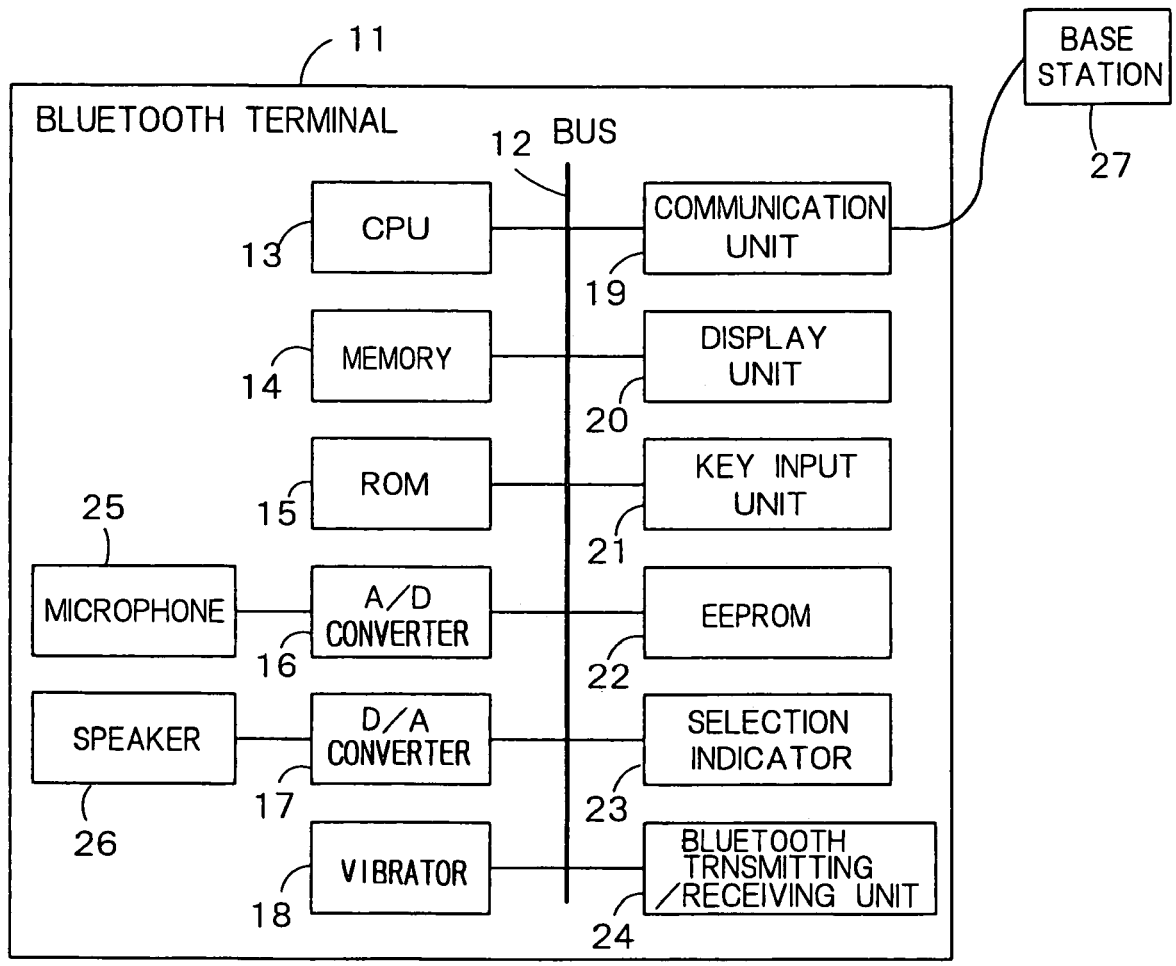
FIG. 2 is a block diagram showing one example of internal configurations of the Bluetooth terminal.

Hereinafter, a wireless communication device, a portable terminal, a communication control program and a program which controls the portable terminal will be more specifically described with reference to drawings. Hereinafter, examples in which connection of Bluetooth is established between the Bluetooth terminal and the Bluetooth device, and the Bluetooth device provides information to user having the Bluetooth terminal will be described hereinafter.

First Embodiment

FIG. 1 is a diagram showing internal configurations of a Bluetooth device which is a first embodiment of an information providing device according to the present invention. The Bluetooth device 10 has a CPU 2, a memory 3, a ROM 4, a storage 5, an RS-232C controller 6 and a wired/wireless communication unit 7 which are connected to a bus 1, and a Bluetooth transmitter/receiver (hereinafter, called a Bluetooth transmitter/receiver) 8 connected to the RS-232C controller 6.

The Bluetooth transmitter/receiver 8 communicates with the Bluetooth terminal 11 based on specifications of Bluetooth. Various information provided to the Bluetooth terminal 11 may be stored in the storage 5, or may be stored in a server on an Internet 9 via the wired/wireless communication unit 7.

Information required from the Bluetooth terminal 11 may be acquired by accessing the server.

Although concrete forms of the storage 5 are not limited, a hard disk drive, a DVD-RAM, a DVD-ROM, a semiconductor disk and so on are assumed. The wired/wireless communication unit 7 may perform wireless communication or wired communication. When performing wired communication, a combination of an Ethernet and an IP (Internet Protocol), or a combination of a telephone line, PPP and IP is assumed. When performing wireless communication, a wireless Internet may be used, or the portable phone or a packet communication of a PHS may be used.

The Bluetooth transmitter/receiver 8 may be composed of only a Bluetooth transmitting/receiving module. Or a CPU and a memory besides the Bluetooth transmitter/receiver 8 are implemented, and processings of an upper protocol such as an L2CAP (Logical Link Control and Adaptation Layer Protocol) and an RFCOMM (RF+COMM) may be performed.

In the case of having only the Bluetooth transmitting/receiving module, an HCI (Host Controller Interface) protocol defined by a specification is transmitted, and the result is received as an event. The Bluetooth protocol is loaded to the memory and executed by the CPU 2 with an application program for providing services and information to users. Besides, an OS, drivers and applications are stored in the memory 3. In the case of performing processings of the upper protocol, commands and events depending on implementation are used, and control of the Bluetooth transmitter/receiver 8 and data transmission/reception are realized.

It is necessarily unnecessary to connect the Bluetooth transmitter/receiver 8 to a host via the RS-232C. For example, the Bluetooth transmitter/receiver 8 may be directly connected to an internal bus, or may be connected via a USB (Universal Serial Bus).

FIG. 2 is a block diagram showing one example of internal configurations of the Bluetooth terminal 11. The Bluetooth terminal 11 of FIG. 2 has a CPU 13, a memory 14, a ROM 15, an A/D converter 16, a D/A converter 17, a vibrator 18, a communication unit 19, a display unit 20, a key input unit 21, an EEPROM 22, a selection indicator 23, and a Bluetooth transmitter/receiver, where are connected to a bus 12. A microphone 25 is connected to the A/D converter 16, and a speaker 26 is connected to the D/A converter 17. The communication unit 19 communicates with a base station 27 by a wired line or a wireless line.

The Bluetooth transmitter/receiver 24 establishes a wireless communication path for e.g. the Bluetooth device 10, and transmits an information transmission request command for a server on the Internet, or acquires information responding to the command.

The Bluetooth transmitter/receiver 24 may have the same configuration as that of the Bluetooth transmitter/receiver 8 in the Bluetooth device 10, or have the configuration different from that of the Bluetooth transmitter/receiver 8.

A sound call function of the Bluetooth terminal 11 is the same as that of the conventional portable telephones. For example, the communication unit 19 performs positional registration for the base station 27, and call control of call-in and call-out to perform data transmission and reception. The communication unit 19 performs call control for disconnection after the communication is finished, and performs hand-over during communication.

The communication unit 19 outputs a call signal from the speaker 26 when connection request from the base station 27 is received. Or the communication unit 19 vibrates a casing of the Bluetooth terminal 11 by driving the vibrator 18, and grabs user's attention. When connection acknowledge response from user is received, carrier connects a line between two locations and communication is started.

The Bluetooth terminal 11 converts sound inputted from the microphone 25, from an analog signal into a digital signal by the A/D converter 16. The Bluetooth terminal 11 performs compression processing of the digital data under control of the CPU 13, and transmits the compressed digital data to a neighboring base station 27 via the communication unit 19. The signal received by the communication unit 19 is decompressed to retrieve the original signal. The decompressed digital data is converted into the analog signal by the D/A converter 17, and the analog signal is outputted from the speaker 26.

The CPU 13, the memory 14, the ROM 15, the display unit 20, the key input unit 21, the EEPROM 22 and the selection indicating unit 23 are provided to perform various information processings. For example, the CPU 13 executes a control program and application programs. The memory 14 stores, for example, temporary parameters and working data. The ROM 15 stores, for example, programs and dictionary data. The display unit 20 displays, for example, menus and data. The key input unit 21 inputs, for example, telephone numbers, numerals and characters. The EEPROM 22 stores, for example, personal registration information. The selection indicating unit 23 selects, for example, menus.

The information acquired from the Bluetooth transmitter/receiver 24 is displayed to the display unit 20 as it is or after converted into format for display.

Figure 3:
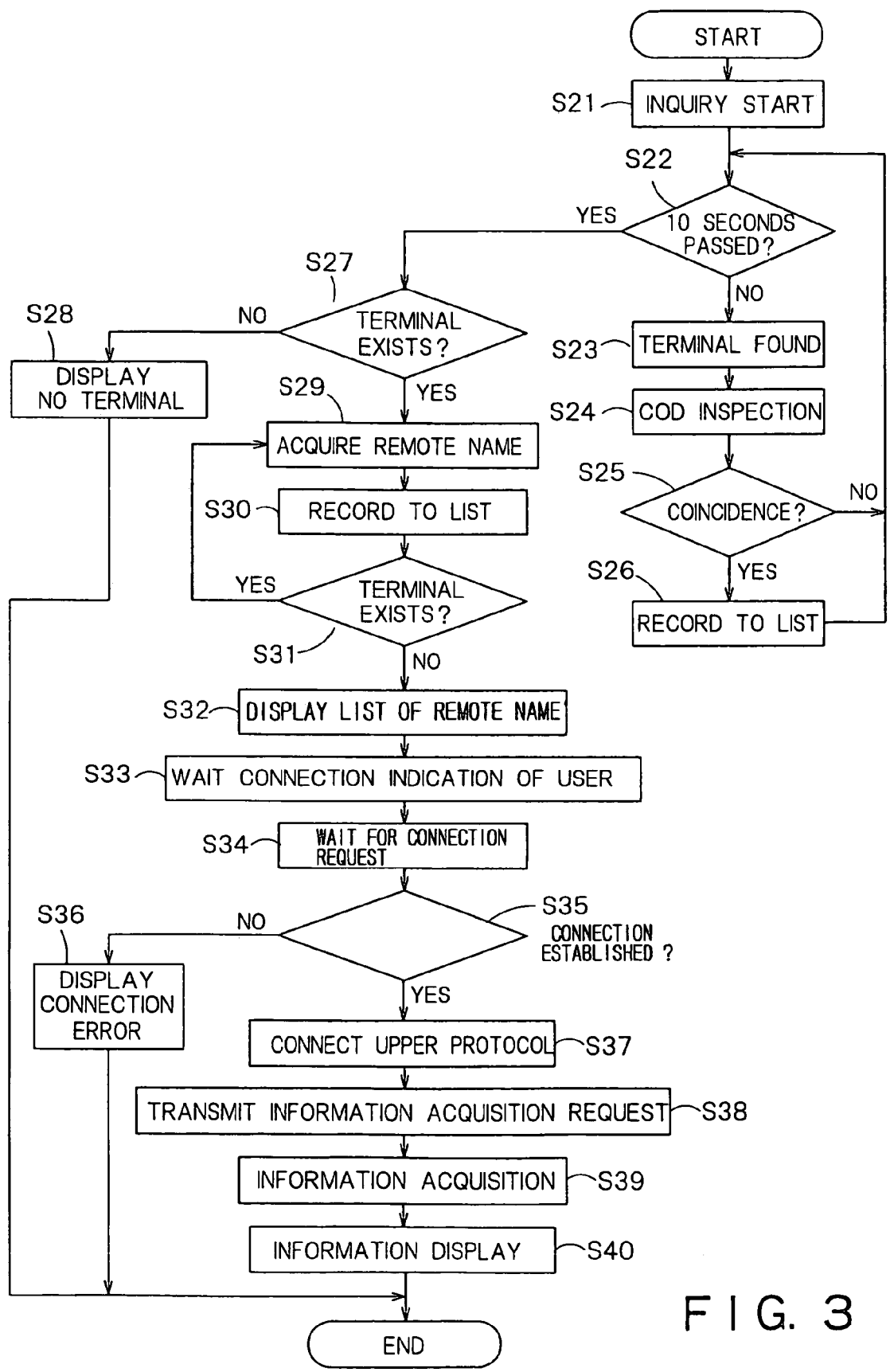
FIG. 3 is a flowchart showing a information acquisition method of the Bluetooth terminal.

FIG. 3 is a flowchart showing a information acquisition method of the Bluetooth terminal 11. First of all, an inquiry for finding other devices capable of communicating is carried out (step S21). Side for performing the inquiry (in this case, the Bluetooth terminal 11) is called as a master, and side for performing the inquiry scan (in this case, the Bluetooth device 10) is called as a slave. Only the Bluetooth device 10 set at a state of the inquiry scan replies to the inquiry from the Bluetooth terminal 11.

The Bluetooth terminal 11 broadcasts the IQ (Inquiry) packet in a periphery for ordinarily 10 seconds in order to perform the inquiry. (step S22). An IAC (Inquiry Access Code) is included in the IQ packet. All the devices or a certain device (the Bluetooth device 10) is found by using this code. The Bluetooth device 10 which has received the IQ packet including the IAC relating to itself replies properties such as the Bluetooth address of itself, a clock and a device class, to the Bluetooth terminal 11, after waiting time decided at random, when the IQ packet is again received.

When the Bluetooth terminal 11 receives the reply from the Bluetooth devices 10 (step S23), the Bluetooth address, the clock and COD of the Bluetooth device 10 including an FHS packet are acquired (step S24). If the COD is designated in advance, only the Bluetooth address having the designated COD is temporarily registered to a list of the memory 14 (step S25 and S26).

After the inquiry is performed for the decided period, an inquiry completion event is received. When this event is received, it is determined whether or not the Bluetooth device 10 is found (step S27), and the fact that the device 10 has not been found is displayed (step S28). When the Bluetooth device has been found, a remote name acquisition command which is useful to a device discrimination of user is transmitted to the Bluetooth device 10 having the Bluetooth address recorded to the list of the memory 14. At this time, it is possible to shorten an acquisition time by using clock information of the Bluetooth device 10 acquired previously.

When response for the request of the remote name from the Bluetooth device 10 recorded to the list is received (step S29), the response is recorded in combination with the Bluetooth address, the clock and the device class acquired previously (step S30), and the recorded contents are displayed to the display unit 20 (step S31 and S32).

The user selects a desirable device from contents displayed to the display unit 20, acquires the corresponding Bluetooth address, and requests connection for the device (steps S33 and S34). When security is requested, input of a link key for certification or input of a PIN code for generating the link key is requested. When an appropriate value is set, a link for data communication is established between a master and a slave (step S35). After the link is established, connection between the relating profiles is performed, and communication is allowed. If the link is not established, connection error is displayed (step S36).

When the link is established, connection is performed with an upper protocol (step S37). When acquisition request of information is transmitted (step S38), the information is acquired (step S39), and the information is displayed (step S40).

When the Bluetooth device 10 provides the information stored in the storage 5 in its own device, an object push profile or a file transfer profile is used, and an L2CAP, an RFCOMM and an FTP are used. When accessing information on the Internet by using the wired/wireless communication unit 7, a dial-up profile or a PAN (Personal Area Networking) profile is used. The L2CAP, the RFCOMM, a PPP, an IP and a HTTP (Hyper Text Transfer Protocol) profile are used for the dial-up profile. The L2CAP, an Ethernet emulation, the IP and the HTTP protocol are used for the PAN profile. The information acquired from the Bluetooth device 10 by the FTP and the information acquired from the server on the Internet by the HTTP is displayed itself or at a display form.

Hereinafter, processing procedure of the Bluetooth device 10 which provides information will be described. First, an embodiment in which connection information is recorded in its own device at assembly time of the Bluetooth device 10 will be described.

Figure 4:
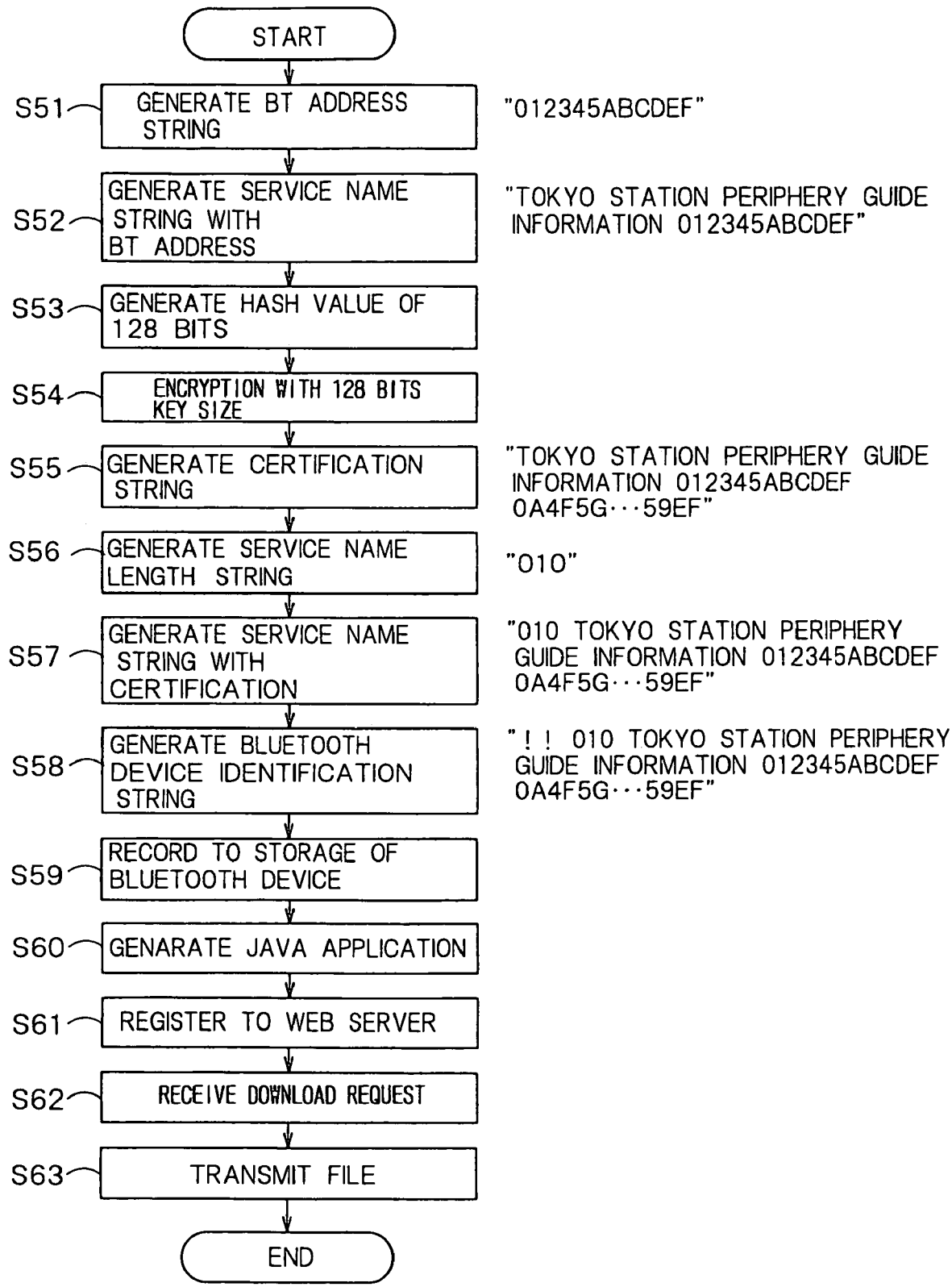
FIG. 4 is a flowchart showing preparation works of the Bluetooth device before providing services.

FIG. 4 is a flowchart showing preparation work of the Bluetooth device 10 before service provision. It is assumed that the Bluetooth address of 6 bytes in the Bluetooth device 10 is expressed by 12 characters of "012345ABCDEF", and a service name expressing service or information provided by the Bluetooth device 10 is expressed by 10 characters of "Tokyo station periphery guide information" (step S51). The former is defined by the Bluetooth address characters, and the latter is defined by the service name characters.

Because data of 22 characters which combines two strings is expressed by two bytes data per one character, the entire size is 44 bytes, i.e. 352 bits. Theses characters are defined as a service name string with Bluetooth address (step S52).

A Hash operation is performed for data of 352 bits to obtain a Hash value with 128 bits (step S53). The encrypted data with 128 bits are calculated from the encrypted data with 128 bits by using a secret key prepared in advance (step S54). MD5 is used for the calculation of Hash value, and Linedale method can be used for encryption. This method is one example. It is possible to obtain the same effect even in the other method which can deal with data with 128 bits. It is possible to use the encryption key except for 128 bits. Calculation time and security strength are traded off by length of the key.

The encrypted Data with 16 bytes and 128 bits is converted into data of 32 characters, for example, "0A4F5G . . . 59EF". Combination of the service name string with Bluetooth address and the converted data are defined as a certification string (step S55). In this example, the certification string is "Tokyo station periphery guide information 012345ABCDEF5G . . . 59EF".

Next, a character length of the service name is expressed by three characters "010", and defined as a service name length string (step S56). 45 characters obtained by combining the service name length string consisted of three characters, the service name string consisted of 10 characters and the certification string consisted of 32 characters are defined as a service name string with certification (step S57). In this example, the service name string with certification is "010 Tokyo station periphery guide information 012345ABCDEF5G . . . 59EF".

A string obtained by attaching two identification string "!!" indicative of performing the processings at high speed to a head of the string are defined as a device identification information (step S58). In this case, the string obtained by step S58 is "!!010 Tokyo station periphery guide information 012345ABCDEF5G . . . 59EF".

Arrangement of the characters in the above-mentioned identification string is only one example, and the same effect will be obtained even when other arrangement of the characters has been adopted. Although conversion of binary character data is performed by only two byte data, it is possible to limit the character size after conversion to about ¾ of original size, according to a conversion method called as UUEN-CODE.

When it is necessary to securely perform the above-mentioned processings by managing the secret key, the device identification information of the Bluetooth device 10 is calculated for each of the Bluetooth devices 10 by using a device having high security, and the generated device identification information of the Bluetooth device 10 is registered in the storage 5 of the Bluetooth devices 10 (step S59). The values of the secret key and the COD are generated as initial data of information acquisition JAVA application (step S60). The values are distributed to users via the server on the Internet with the JAVA program (step S61). The user who wants information acquisition accesses a certain server via a public network (step S62), and receives download request of the JAVA application. The JAVA application is stored in its own terminal, and used when the information is acquired (step S63).

The secret key may be distributed with the JAVA application. Or as described later, when it is possible to securely manage the secret key by the Bluetooth device 10, the JAVA application may be updated by periodically acquiring the secret key from a dedicated server.

Hereinafter, processings in the case where the Bluetooth device 10 provides services will be described. FIG. 5 is a flowchart showing processing procedure in the case where the Bluetooth device 10 provides services. A desired program is read from the storage 5 into the memory 3 when the Bluetooth device 10 providing information is powered on, and operation of an application for realizing information service is begun (step S71). The application controls the Bluetooth transmitter/receiver 8 and executes a stack for realizing the Bluetooth protocol in order to connect with the Bluetooth terminal 11 held by user (step S72).

First, the application transmits a reset command for the Bluetooth transmitter/receiver 8 (step S73). Therefore, the Bluetooth transmitting/receiving unit is resetted. Next, the application sets the device identification information of the Bluetooth device 10 to a local name of its own device which can be acquired by a remote name acquisition command from the other device (step S74). Next, the application sets the COD device as an object transmission system or an information system (step S75).

After then, inquiry scan and page scan become enable (step S76), and connection waiting state of the Bluetooth terminal 11 is set (step S77). When connection of the Bluetooth terminal 11 is established (step S78), the inquiry scan and the page scan are disenabled (step S79), and service is offered for the connected Bluetooth terminal 11 (step S80). When provision of the service is finished, connection is cut off (step S81).

Figure 6:
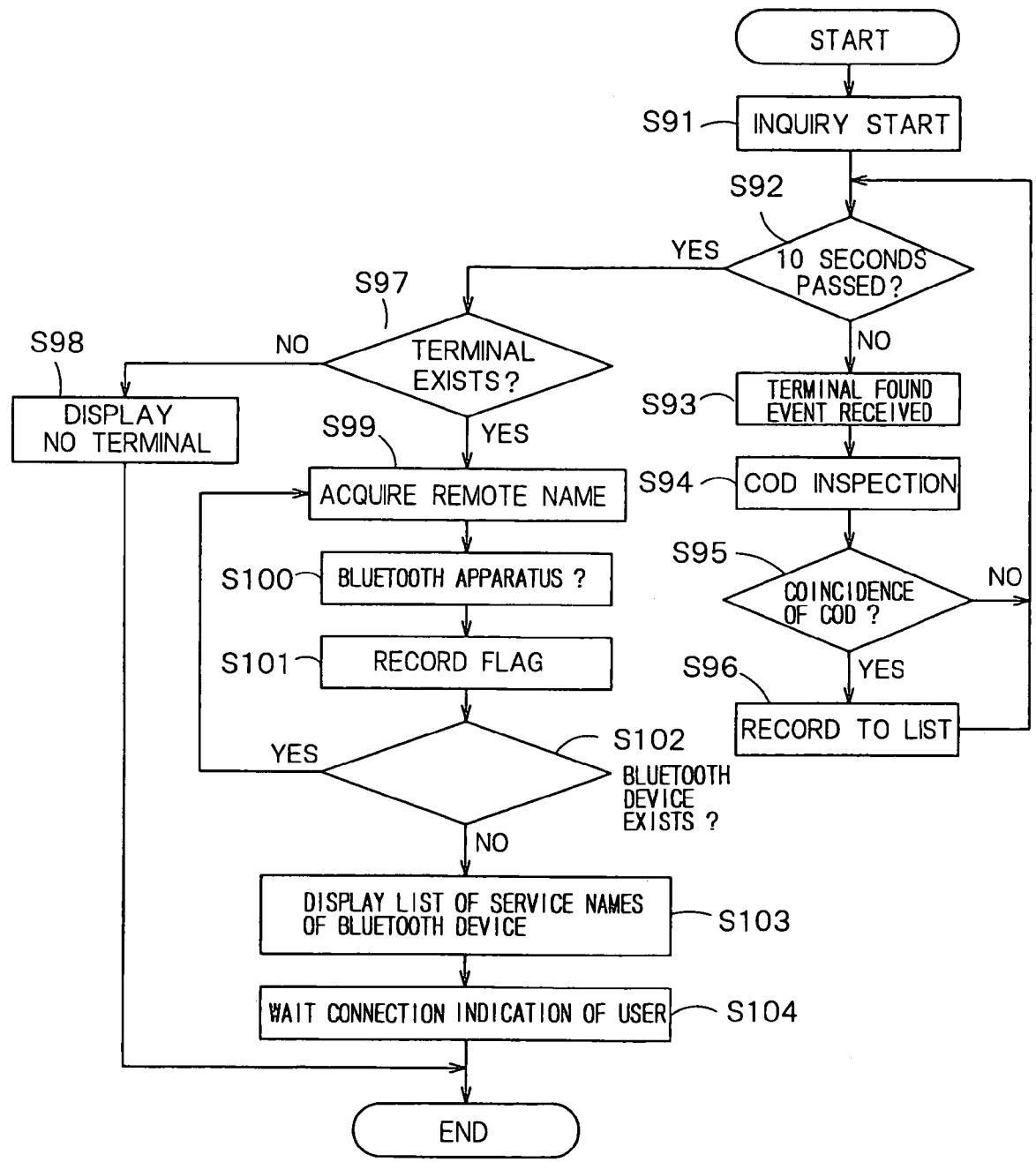
FIG. 6 is a flowchart showing processing procedure of the Bluetooth terminal.

Next, operations of the Bluetooth terminal 11 will be described. FIG. 6 is a flowchart showing processing procedure of the Bluetooth terminal 11. User who wants acquisition of information indicates start-up of a dedicated JAVA application and search of the Bluetooth device 10 (step S91). The JAVA application requests the inquiry command transmission for the Bluetooth transmitter/receiver 24. The search is performed for a prescribed time (for example, 10 seconds) (step S92).

The Bluetooth transmitter/receiver 24 notifies the JAVA application of the address and the COD of the found Bluetooth device 10 as an event (step S93). The JAVA application calls a certain function by the notification, and performs inspection of the COD (step S94). The Bluetooth transmitter/receiver 24 compares the notified COD with the COD prescribed in advance (step S95). Only when both CODs coincide, the Bluetooth address of the Bluetooth device 10 is added to an inspection object list (step S96).

The Bluetooth transmitter/receiver 24 stops the inquiry after being passed for a constant period, and notifies the application of the inquiry completion event. When the inquiry completion event is received, the application determines whether or not the Bluetooth device 10 registered to the inspection object list exists (step S97). If the Bluetooth device 10 does not exist, "no. terminal" is displayed (step S98).

If the Bluetooth device 10 registered to the inspection object list exists, the Bluetooth transmitter/receiver 24 is indicated so as to sequentially transmit the remote name acquisition command for the devices 10 registered to the list (step S99). It is validated whether or not the Bluetooth device 10 is valid. The validated result is recorded as a flag (step S100 and S101). The acquisition and validation of the remote name are repeated by the number of the terminals registered to the list (step S102). Whether or not the devices are reliable is separately determined.

The flag which determines whether or not the Bluetooth devices of all the inspection objects are reliable is inspected. In the case of reliable device, the service name is displayed to the screen as a candidate of the service providing device (step S103). In the case of unreliable device, the service name is not displayed on the screen, or is displayed on a form distinct from the reliable device. User can arbitrarily set whether or not to display an unreliable device. As the distinct method, display by different color, italic font and a certain mark are assumed.

When user requests the connection to an unreliable Bluetooth device 10, user is informed that it is the unreliable device, and confirmation of the connection is performed (step S104).

Figure 7:
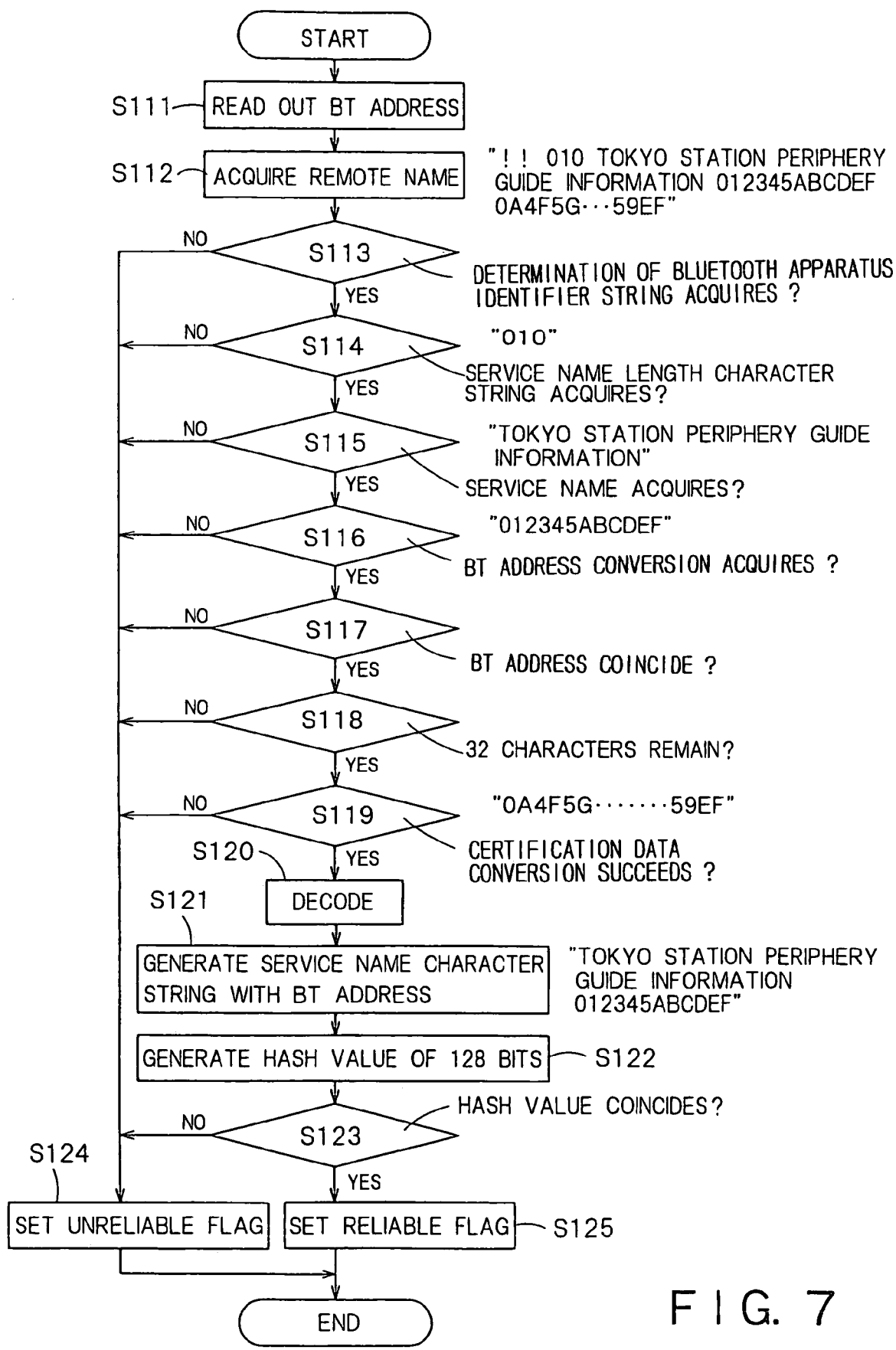
FIG. 7 is a detailed flowchart showing processing procedure of the Bluetooth terminal.

Next, validation procedure of step S100 in FIG. 6 is more specifically described by using the flowchart of FIG. 7. First of all, a method of data acquisition for validation and a method of validation using the acquired data will be described.

The Bluetooth transmitter/receiver 24 reads out the Bluetooth address of the Bluetooth device 10 of the other communication device (step S111). When the remote name is acquired (step S112), the acquisition is notified to the JAVA application. The JAVA application inspects data of the acquired remote name.

The JAVA application determines whether or not headmost several characters of the remote name acquired first is the identification string (step S113). In this case, the identification string is "!!". When the headmost several characters does not coincide with the identification character, a flag which indicates not to coincide with the Bluetooth address of the Bluetooth device 10 being inspection object is stored in the memory 14 in pairs, and the next remote name of the Bluetooth device 10 is acquired.

When the headmost several characters coincide with the identification character, three characters from third character (six bytes when calculated by binary data), i.e. "010" is extracted. The data is acknowledged as the service name length character, and character numeral data conversion is performed to obtain the length of the service name (step S114).

When error occurs at conversion time, the Bluetooth address of the Bluetooth device 10 being inspection object and a flag which indicates discord are stored in the memory 14 in pairs, and the remote name of the subsequent Bluetooth device 10 is acquired.

When conversion to numeral can be performed, ten characters from sixth character of the acquired length, for example, a string of ten characters "Tokyo station periphery guide information" is acquired as a service name (step S115). Six characters+a length of the service name string +1, (in this case, 12 characters from 6th character) are acquired as the Bluetooth address string. The Bluetooth address string is converted into the Bluetooth address of six bytes (step S116). The Bluetooth address string is compared with the address of the Bluetooth device 10 which has acquired the remote name (step S117).

When the addresses do not coincide with each other, the Bluetooth address of the Bluetooth device 10 being inspection object and the flag which indicates discord are stored in the memory 14, and the remote name of the next Bluetooth device 10 is acquired.

When the addresses coincide with each other in step S117, it is inspected whether or not length of the remaining string from 28th character is 32 characters (step S118). If 32 characters, the string is acquired as data for certification, and the acquired character data is converted into binary data of 16 byte (step S119).

When it is impossible to acquire the service name with a length of the service name, it is impossible to convert the Bluetooth address string into the Bluetooth address of 6 bytes, length of the remaining characters is different from 32 characters, or it is impossible to convert certificate data into numeral, the Bluetooth address of the Bluetooth device 10 being inspection object and the flag which indicates discord are stored in the memory 14 in pairs, and the remote name of the next Bluetooth device 10 is acquired.

In the case of being able to convert the string into binary data in step S119, the terminal is certificated by using the service name and the certification data acquired from the remote name by the above-mentioned procedure.

The Bluetooth address of the Bluetooth device 10 which has acquired the remote name is converted into character data of 12 string "012345ABCDEF" (step S120). Data of 22 characters with the service name string is expressed by one character two byte data, and becomes 44 bytes and 352 bits in total (step S121). The Hash operation is performed for the data with 352 bits, and the Hash value with 128 bits is obtained (step S122).

The acquired data for certification is decoded by using the secret key prepared in advance, and the Hash value with 128 bits is calculated. The value is compared with the Hash value calculated previously (step S123). If the other communication device holds a correct secret key, both values coincide, and the flag indicative of coincidence is set (step S124). If the secret key is different, the decoded data is different, and the Hash value does not coincide. When both values do not coincide, the Bluetooth device 10 under inspection sets the flag indicative of discord (step S125), and the remote name of the next device is acquired.

Even if an illegal device copies the device identification information of the Bluetooth device 10 set to a correct device, the Bluetooth address of the correct device is different from that of the illegal device, and the Hash value does not coincide. Therefore, it is possible to detect the illegal device.

Although the key has been commonly used in both sides in the present embodiment, the same effect is also obtained by using a public key. The device identification information of the Bluetooth device 10 is generated, the secret key is used, and the same effect is obtained by distributing the JAVA application including the public key corresponding to the secret key.

In the above embodiment, the device identification information of the Bluetooth device 10 is recorded to the Bluetooth device 10 in advance. When the Bluetooth device 10 has an other communication means, the device identification information of the Bluetooth device 10 generated by a different secret key is acquired periodically or if necessary, and the device identification information of the Bluetooth device 10 is updated. The JAVA application periodically may access a server, and security may be strengthened by updating a common secret key. Or if the Bluetooth device 10 can securely store the secret key, the Bluetooth device 10 in itself may update the device identification information of the Bluetooth device 10 periodically or if necessary.

When the Hash value is generated, the security may be strengthened by generating data secret to both sides.

When the Bluetooth device 10 updates the device identification information of the Bluetooth device 10 by using the public key, the same effect is obtained by using the information such as time, instead of the Bluetooth address of the Bluetooth device 10.

Or an expiration date of the identification information is included in the device identification information of the Bluetooth device 10, and the portable terminal inspects the expiration date, thereby strengthening security.

Or in order to connect with an upper protocol such as OBEX, the service information acquisition protocol is executed, and the information necessary for connection is acquired. It is possible to omit the communication for the service information acquisition by including the connection information in the device identification information of the Bluetooth device 10, thereby shortening the processing time.

In the Bluetooth terminal 11, in order to speed up the processings, the address of the Bluetooth device 10 determined to be unreliable is stored in the memory 14 as a list of the unreliable devices, and then after the inquiry is finished, the Bluetooth address of the found Bluetooth device 10 is compared with the list of the unreliable device. If determined that the device is unreliable, the device is not included in the list of the inspection objects, thereby improving the entire processing speed.

Thus, according to the present embodiment, because the device identification information of the Bluetooth device 10 is composed of the service name, the Bluetooth address and the encryption data, the Bluetooth terminal 11 which has received the device identification information can exactly determine whether or not the Bluetooth device 10 trying to connect is reliable, thereby avoiding communication with the illegal device and improving security.

Furthermore, according to the present embodiment, the Bluetooth device 10 which performs information service may have the secret key with expiration date, and may allow the Bluetooth terminal 11 to periodically update the key, thereby improving the security. In this case, the Bluetooth terminal 11 uses its own inherent identifier, and connects with the Bluetooth device 10 (server) in order to update the encryption key. Therefore, the Bluetooth device 10 can provide membership service to the Bluetooth terminal 11.

Second Embodiment

In a second embodiment, data communication is directly performed with P2P (Point to Point) between a plurality of Bluetooth terminals.

Hereinafter, a Bluetooth terminal having a function found to other devices by setting a certain keyword, and a Bluetooth terminal having a function which finds the other devices by inputting the keyword will be described.

The Bluetooth terminals access a certain server via the Internet, register the information relating to its own terminal (for example, an identifier for short-range wireless communication), and download a program executing information exchange. The program has a function found from the other communication device and a function for finding the other communication device. A certain function to be used is selected from the menu. Or two applications having the respective functions may be provided. With the program, an encryption key to identify the communication device for information exchange, for example, a common secret key with 128 bits length is downloaded from the server, and is recorded to the Bluetooth terminal with the program.

Figure 8:
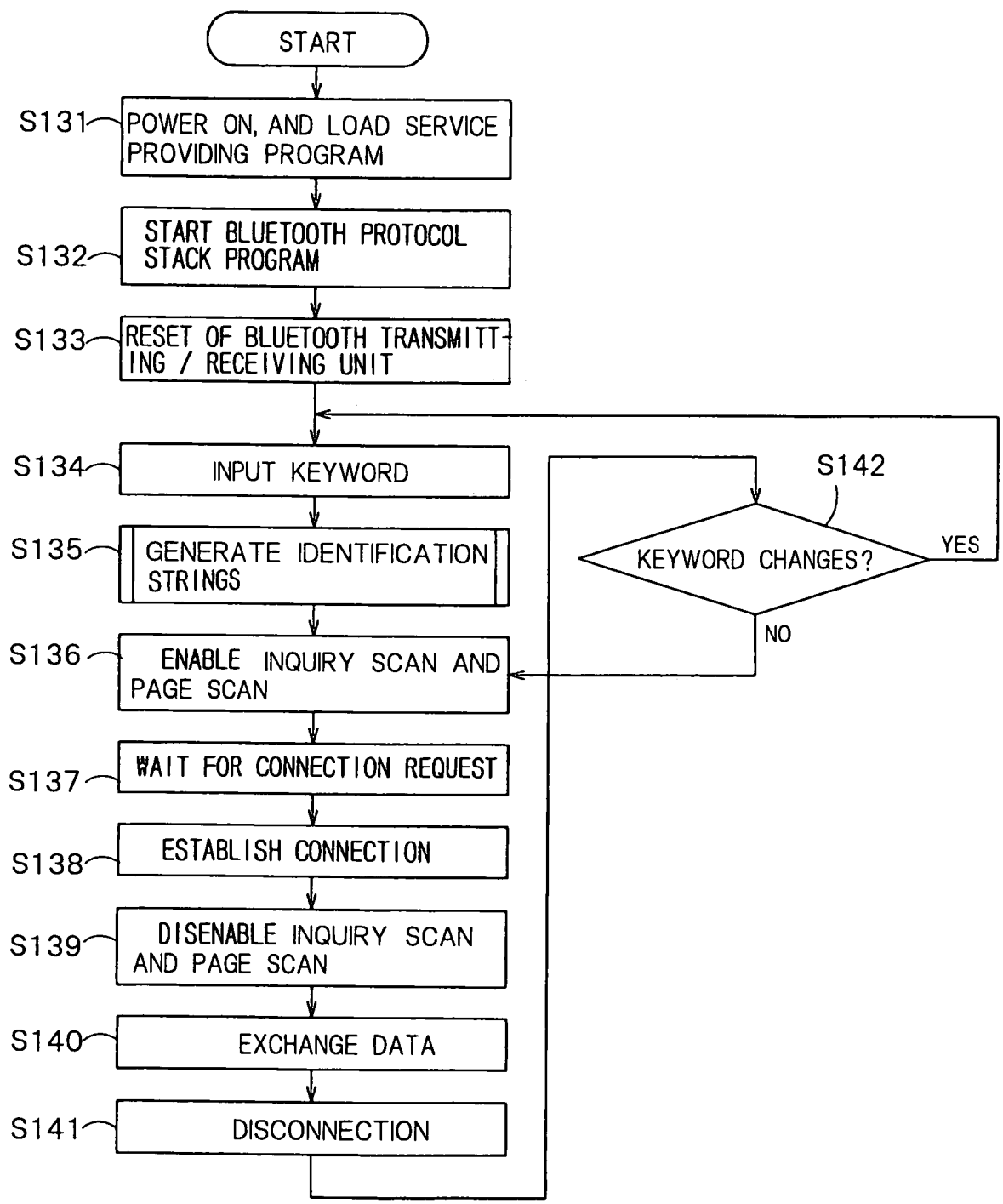
FIG. 8 is a flowchart showing processing procedure found by the other Bluetooth terminal.

FIG. 8 is a flowchart showing processing procedure to be found to the other Bluetooth terminal.

First, power is on and a service providing program is loaded (step S131). After then operation of the Bluetooth protocol stack program is started (step S132). Next, the Bluetooth transmitting/receiving unit is reset (step S133). The keyword is inputted by user, and stored in the memory (step S134). The number of the keywords is not limited, and may be one or more, if the character length of the keyword is less than a certain data amount. In the present embodiment, as one example, three words of "bar", "karaoke" and "game" are registered as the keywords.

Figure 9:
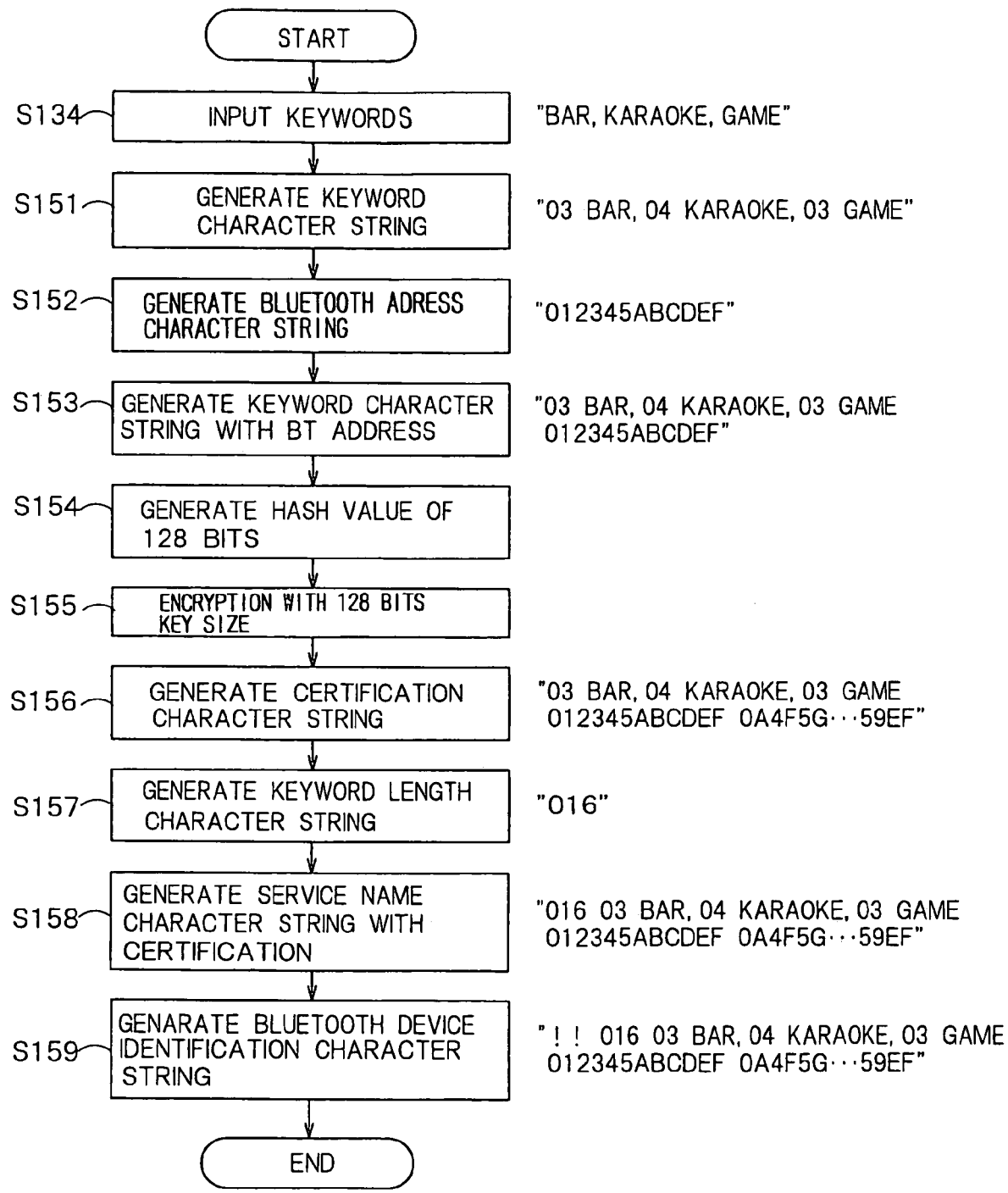
FIG. 9 is a flowchart showing a detailed processing procedure of step S135.

Next, a identification character generating process for generating the Bluetooth device identification string is performed by using the keywords (step S135). The detailed processing procedure of step S135 is shown in FIG. 9. First, one string is generated by coupling the keywords. The keyword lengths of two characters are added before the respective keywords so as to be able separate them afterward, thereby generating one string (step S151). In the present embodiment, the characters "04", "04" and "03" are attached, and the keyword string "03bar04karaoke03game" is generated.

Next, the Bluetooth address of the Bluetooth terminal is generated. (step S152). The Bluetooth address is assumed as "012345ABCDEF". Next, a keyword string with Bluetooth address is generated by coupling the Bluetooth address with the keyword string (step S153). The keyword string with Bluetooth address is "03bar04karaoke03game012345ABCDEF".

Next, the Hash value with 128 bits corresponding to the string generated by step S153 is calculated (step S154). Encryption is performed with a common encryption key stored relating to the program (step S155). Therefore, the encryption data is converted into a string of 32 characters. A certification string is generated by coupling the data with the keyword string with Bluetooth address (step S156).

Next, the string of three characters indicative of a length of the keyword string is generated (step S157). The string is coupled with a string for certification (for example, "016") to generate a service name string with certification (step S158). Finally, an identification characters (for example, "!!") for determining at high speed whether or not to be a certified other communication device are added to generate the Bluetooth device identification string (step S159).

In FIG. 8, the Bluetooth device identification string generated by the above-mentioned is set to the Bluetooth module as a local name. The Bluetooth module is set to a state capable of being found and connected from the other communication device (step S136), and waits connection request for the discovery and the connection request from the other communication devices (step S137).

After then, connection allowance is given to the connection request from the Bluetooth terminal of the other communication device (step S138). After connection of a link layer, connection using the protocol of the upper layer for data exchange is performed. For example, OPP (Object Push Profile) is used in the present example, and electric business card data called as a vcard in which personal mail addresses, telephone numbers and the other additional information are described is exchanged (step S139 and S140). After exchanging data, if a cutoff event of link is detected, the acquired data is recorded with time, and execution of data exchange is indicated to user. The user determines whether or not to continue the processings, and selects from the menu commands indicative of continuation of the processings, keyword change or end of the processings (steps S141 and S142).

When the processings are continued, a receiving event of the connection request is waited without performing any processing. When the keyword is changed, the keyword stored in the memory is deleted, and input procedure of the keyword is executed again. When the end is selected, the program is finished.

Figure 10:
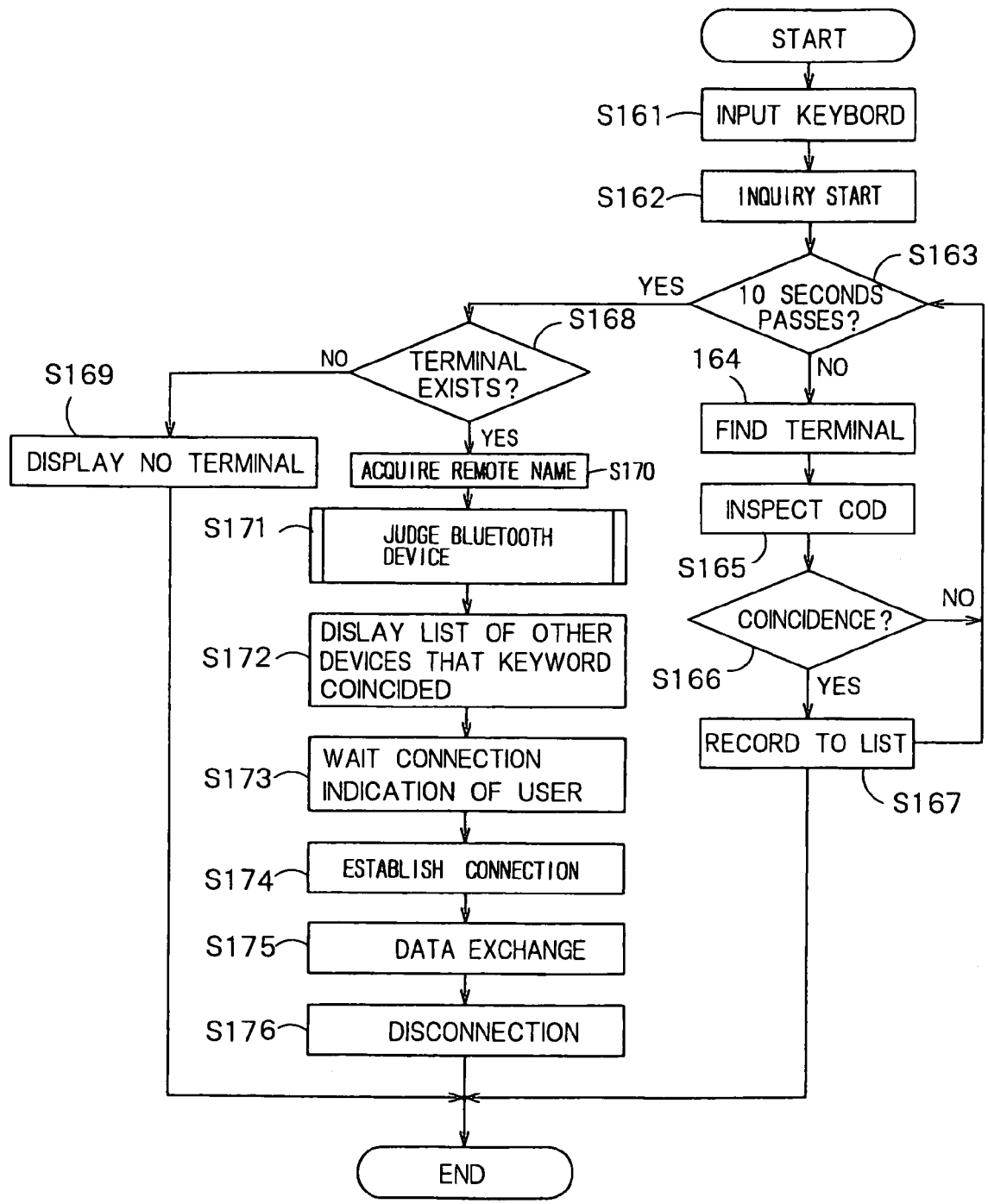
FIG. 10 is a flowchart showing processing procedure to find the other Bluetooth terminal.

FIG. 10 is a flowchart showing processing procedure to find the other Bluetooth terminal. First, the program is started-up, the operation mode having a function for finding the Bluetooth terminal from the menu is designated, and user is requested to input the keyword (step S161). The number of the keyword is not limited, and may be one or more, If a plurality of keywords are inputted, it is possible to perform complicated designations by logic operation such as AND, OR and NOT of the keyword. In this example, the inputted keyword is assumed as "karaoke".

After inputting the keyword, the Bluetooth module is indicated by a search command so as to find the other communication device (step S162). The. Bluetooth module transmits a search message for a constant period (the period is normally 10.24 sec, but may be arbitrary period). Every time when the Bluetooth module receives a response packet, the Bluetooth module records the identifier of the responded device and the connection information. At this time, the COD indicative of a type of the responded Bluetooth terminal is inspected, and only the information of the Bluetooth terminal having a desirable COD is recorded (step S163-S167).

After search for a constant period, the Bluetooth module inspects the number of desirable Bluetooth terminals (step S168). If no Bluetooth terminal is found, "no terminal" is displayed (step S169). Next, the remote name is acquired (step S170). If one or more Bluetooth terminal is found, terminal certification processings of the respective Bluetooth terminals are performed (step S171).

Figure 11:
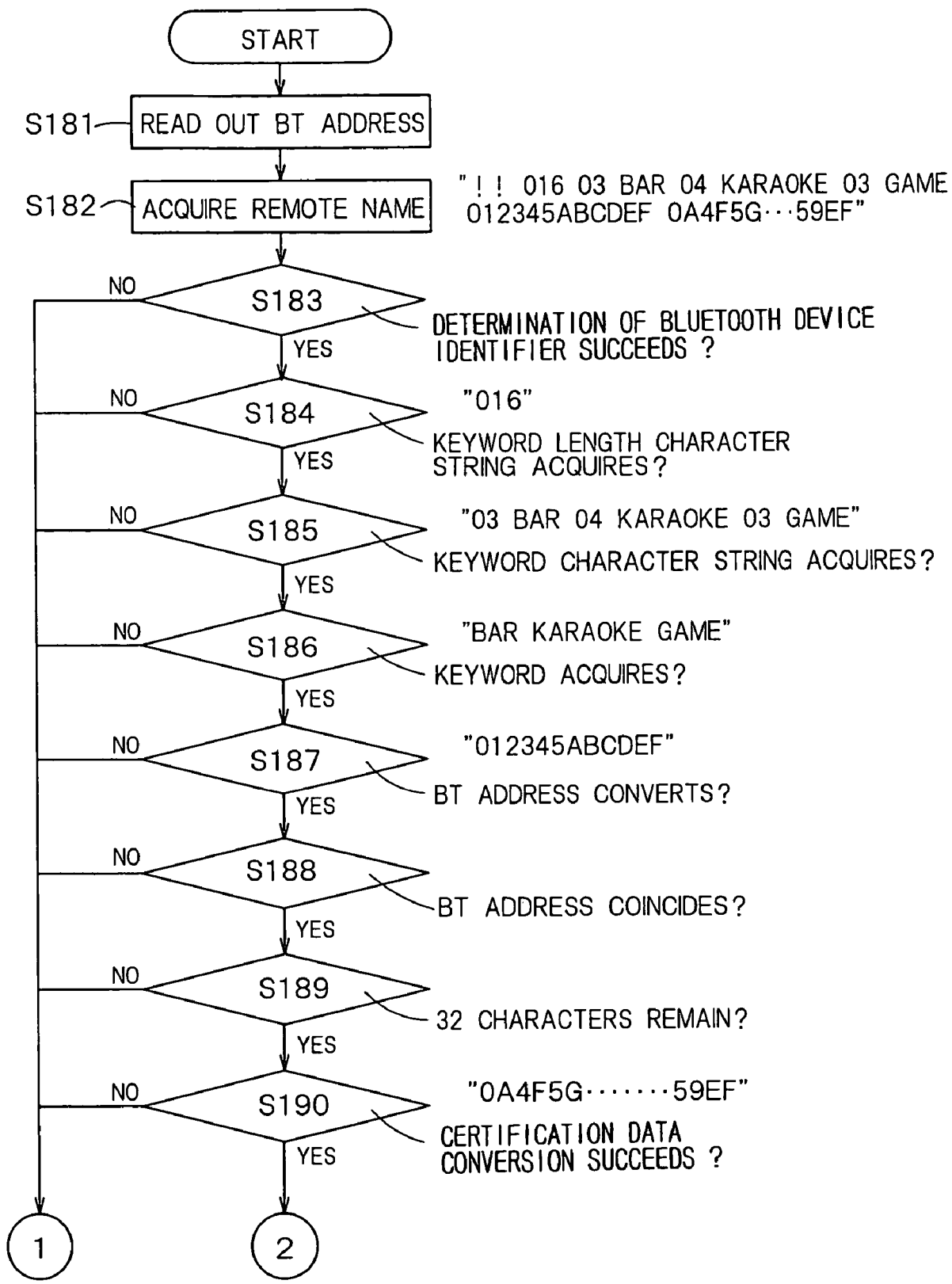
FIG. 11 is a flowchart showing a detailed processing procedure of terminal certification processings of step S170.
Figure 12:
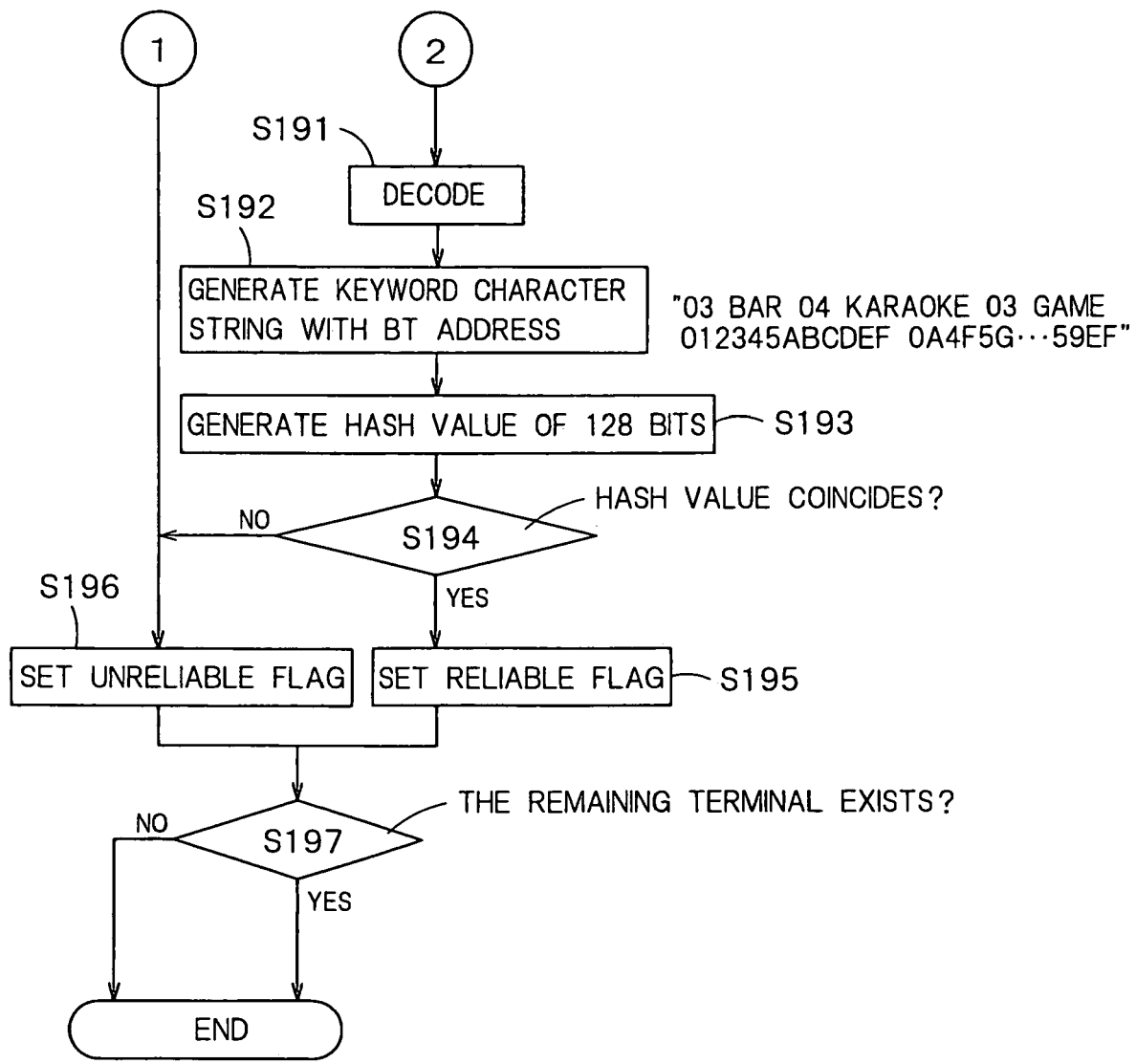
FIG. 12 is a flowchart following to FIG. 11.

FIG. 11 and FIG. 12 are flowcharts showing detailed processing procedure of the terminal certification processings in step S171. First, the Bluetooth address is read out (step S181), the Bluetooth modules of the Bluetooth terminals are indicated so as to acquire the remote name (step S182). When the Bluetooth module succeeds acquisition of the remote name, the information is delivered to the program.

The program inspects the acquired remote name by the following procedures, and determines whether or not the Bluetooth terminal of the other communication device is reliable. First, it is inspected whether or not there are the identification characters capable of being determined at high speed (step S183). If there are the identification characters, the string indicative of the length of the keyword is acquired (step S184). In this example, the string is "016".

Next, a string corresponding to the string indicative of the length of the keyword is extracted (step S185). In this example, the string is "03bar04karaoke03game". Next, the headmost two characters are inspected, a string indicative of length of the keyword is acquired, the string is cut off based on the character indicative of length of the keyword, and the cut-off string is stored in the memory as the keyword (step S186). In this example, the keyword of the other communication device is "bar karaoke game".

Next, the acquired keyword is compared with the keyword inputted by user in advance. When determined that the keyword coincides, certification procedure of FIG. 11B is executed.

When determination of the keyword is succeeded, the Bluetooth address is converted (step S187). It is determined whether or not the Bluetooth address of the found other communication device is coincided (step S188). It is inspected whether or not the remaining string is 32 characters (step S189). If 32 characters, the string is converted into the binary data with 128 bits (step S190). The data is decoded by using an encryption key which has been stored with the program (step S191).

The keyword string with Bluetooth address is generated (step S192), and the Hash value with 128 bits is generated (step S193). This value is compared with the previously decoded value (step S194). If both values coincide, the flag indicative of what the other communication device is reliable is set. The flag is stored in the memory with the keyword and the Bluetooth address (step S195). When the determination is missed, the keyword and the Bluetooth address are recorded as the unreliable device (step S196). The above-mentioned processings are repeated for the number of the found devices.

After all the Bluetooth terminals are determined, as shown in FIG. 10, the flags of the Bluetooth terminals are inspected, the keyword string is displayed, and the keyword string is proposed to user (step S172). When it is impossible to display the keyword string on one line of the screen, user brings a cursor on the line and indicates a detailed command. Therefore, a different dialog is displayed, and all the keywords are displayed in order to wait connection request by user (step S173).

When user indicates a connection command by bringing the cursor on a certain line of the list, the Bluetooth address corresponding to the line is acquired, and connection for the Bluetooth module is requested (step S174) When succeeding to link connection, connection is performed by using the protocol of the upper layer, data exchange is performed (step S175), and the link is cut off (step S176).

When cut-off of the link is succeeded, the next Bluetooth terminal is selected from the list. Or the Bluetooth terminal capable of connecting again is searched. Or the search is performed by changing the keyword. Or any command is selected to end the program.

By the above-mentioned method, its own information is registered to a certain server in advance, and only when encryption key is acquired, it is possible to connect with only a reliable communication device.

On the other hand, it is assumed that a side for finding the other communication device requests connection by ignoring the keyword. In this case, when the found side is set to be the certification mode, input of, a common link key is requested at link connection processing time. Only when both sides input correct keywords, the link is established. A processing module for generating a common link key is added to the program, the program responds by generating the link key at input request time of the link key. In such a method, it is impossible to perform connection as long as there is no module for generating a correct link key. As one example of the method of generating the link key, the string is generated by using the Bluetooth identifier of the other communication device, its own Bluetooth identifier and a secret keyword, and the Hash value with 128 bits is generated by using the string.

Processings of FIGS. 4-7 described in the above-mentioned embodiments may be composed of hardware or software. In the case of being composed of the software, the program which executes the processings of FIGS. 4-7 is stored in the recording medium such as a floppy-disc or a CD-ROM, and may be executed by being read in a computer. The recording medium is not limited to a medium portable such as a magnetic disc and an optical disc, and may be a fixed type recording medium.

The programs for executing processings of FIGS. 4-7 may be distributed via a communication line (including a wireless line) such as the Internet. Furthermore, the program may be distributed via the wired line or the wireless line such as the Internet at a state of being encrypted, modulated or compressed. Or the program may be distributed at a state of being contained on the recording medium.

The present invention is not limited to the above-mentioned embodiments, and can be variously modified at ranges of not deviating features of the present invention when being implemented. The above-mentioned embodiments include various stages of the inventions, and various inventions can be extracted by arbitrarily combining constituents of these embodiments. For example, even if some constituents among all the constituents described in the embodiments are deleted, it may be possible to overcome at least one of the problems to be overcome by the present invention. When the advantageous effect is obtained even if some constituents are deleted, constituents which omit some constituents are extracted as the present invention.

What is claimed is:

1. A wireless communication device, comprising:
a wireless communication unit which communicates with other communication device located at a prescribed range;
a first identification information generator which generates first identification information including a service name of available service and inherent information;
an encryption unit configured to encrypt said first identification information by using a prescribed encryption key to generate encryption data;

a second identification information generator which generates second identification information including the service name, the inherent information and the encryption data; and an inherent information transmitter which transmits the second identification information for an other communication device which has requested transmission of the inherent information.

2. The wireless communication device according to claim 1, wherein said first identification information generator uses a Hash value obtained by a Hash operation for data including the service name and the inherent information, as said first identification information.

3. The wireless communication device according to claim 1, wherein said second identification information generator generates the second identification information in which the encryption data is arranged after the service name, and information indicative of a length of the service name is arranged before the service name.

4. The wireless communication device according to claim 1, wherein said second identification information generator generates the second identification information in which information indicative of whether or not check of reliability is necessary is arranged before information indicative of a length of the service name.

5. The wireless communication device according to claim 1, wherein said wireless communication unit communicates with the other communication devices by P2P (Peer to Peer).

6. The wireless communication device according to claim 1, wherein said encryption unit encrypts again the first identification information to generate the encryption data, when an expiration data of the encryption key passes.

7. A portable terminal, comprising:

a wireless communication unit which communicates with other communication devices located at a prescribed range;

a search unit configured to search the other communication devices capable of communicating;

an identification information acquisition unit which acquires first identification information transmitted from the searched communication device;

an information extracting unit configured to extract a service name, inherent information and encryption data from the acquired first identification information;

a decryption unit configured to decrypt the encryption data by using a prescribed decryption key;

a comparison unit configured to compare the decrypted data with the service name and the inherent information extracted by said information extracting unit, and to determine whether or not the other communication device searched by said search unit is reliable; and a communication controller which inhibits communication with the communication device determined to be unreliable by said comparison unit.

8. The portable terminal according to claim 7, further comprising:

an information indicating unit which indicates to users information indicative of being unreliable when users try to connect to the communication device determined to be unreliable by said comparison unit.

9. The portable terminal according to claim 8, further comprising:

a list register unit configured to register a list of the other communication devices determined to be unreliable by said comparison unit;

wherein said communication controller inhibits communication with the communication devices registered to said list register unit.

10. The portable terminal according to claim 7, wherein said identification information acquisition means extracts data of a first length from a head of the information transmitted from the communication device searched by said search unit, and determines whether the information is the first identification information based on the extracted data.

11. The portable terminal according to claim 10, wherein said information extracting unit extracts data of a second length from a head of the first identification information, and decides a length of the service name based on the extracted data.

12. The portable terminal according to claim 11, wherein said information extracting means extracts data of a length of the decided service name from a head of data except for data of the first and second lengths from a head of the first identification information, as the service name.

13. The portable terminal according to claim 12, wherein said information extracting unit extracts data of a third length from a head of data except for the first length, the second length and the length of the decided service name from the head of the first identification information, an inherent information.

14. The portable terminal according to claim 13, wherein said information extracting means determines whether or not data except for the first length, the second length, the length of the decided service name, and the third length from a head of the first identification information is a fourth length, and if the data is the fourth length, extracts the data as the encryption data.

15. The portable terminal according to claim 7, further comprising a Hash operation unit which performs a Hash operation for data including the service name and the device identification name extracted by said information extracting unit to generate a Hash value, wherein said comparison unit compares the decoded data with the generated Hash value.

16. The portable terminal according to claim 7, wherein said wireless communication means communicates with the other communication devices by P2P (Peer to Peer).

17. The portable terminal according to claim 7, wherein said decoder decodes the encryption data by using a new decryption key when an expiration date of the decryption key passes.

18. A computer readable recording medium storing a computer program code which controls a portable terminal, to perform controls comprising:

communicating with other communication devices located at a prescribed range; searching a communication device capable of communicating;

acquiring first identification information transmitted from the searched communication device;

extracting a service name, inherent information and encryption data from the acquired first identification information;

decrypting the encryption data by using a prescribed decryption key; comparing the decoded data with the extracted service name and inherent information, and determining whether or not the communication device searched by the searching unit is reliable based on the comparison result;

and inhibiting communication with the communication device determined to be unreliable by the comparison result.

19. A communication system comprising a portable terminal and a wireless communication unit capable of communicating with said portable terminal located at a prescribed range, wherein said portable terminal includes:

a searching unit configured to search a communication device capable of communicating;

an identification information acquisition unit configured to acquire first identification information transmitted from the searched communication device;

an information extracting unit configured to extract a service name, inherent information and encryption data from the acquired first identification information;

a decryption unit configured to decrypt the encryption data by using a decryption key prescribed in advance;

a comparison unit configured to compare the decrypted data with the service name and the inherent information extracted by said information extraction unit, and determines whether or not the communication device searched by said searching unit is reliable; and a communication controller which inhibits communication with the communication device determined to be unreliable by said comparison unit, said wireless communication unit includes:

an inherent information acquisition unit configured to acquire the inherent information;

a first identification information generator which generates first identification information including the service name and the inherent information;

an encryption unit configured to encrypt the first identification information by using the encryption key prescribed in advance, and generates the encryption data;

a second identification information generator which generates second identification information including the service name, the inherent information and the encryption data; and an inherent information transmitter which transmits the second identification information for the other communication device which has requested transmission of the inherent information.

* * * * *